(12) United States Patent
Benz et al.

(10) Patent No.: US 9,964,003 B2
(45) Date of Patent: May 8, 2018

(54) GAS TURBINE POWER PLANT WITH FLUE GAS RECIRCULATION AND CATALYTIC CONVERTER

(71) Applicant: ANSALDO ENERGIA IP UK LIMITED, London (GB)

(72) Inventors: Eribert Benz, Birmenstorf (CH); Klaus Döbbeling, Windisch (CH); Michael Hoevel, Ennetbaden (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 548 days.

(21) Appl. No.: 14/591,434

(22) Filed: Jan. 7, 2015

(65) Prior Publication Data

US 2015/0121892 A1   May 7, 2015

Related U.S. Application Data

(63) Continuation of application No. PCT/EP2013/064765, filed on Jul. 12, 2013.

(30) Foreign Application Priority Data

Jul. 13, 2012   (EP) .................................... 12176258

(51) Int. Cl.
*F01K 23/10* (2006.01)
*F02C 3/34* (2006.01)
*F02C 6/18* (2006.01)

(52) U.S. Cl.
CPC .............. *F01K 23/103* (2013.01); *F02C 3/34* (2013.01); *F02C 6/18* (2013.01);
(Continued)

(58) Field of Classification Search
CPC .......... F01K 23/10; F01K 23/103; F02C 3/34; F02C 6/18; F05D 2270/082; Y02E 20/14; Y02E 20/16; Y02T 10/22
(Continued)

(56) References Cited

U.S. PATENT DOCUMENTS 4,899,544 A    2/1990 Boyd
5,163,829 A *  11/1992 Wildenberg ............ F23G 7/068
                                                          110/211
(Continued)

FOREIGN PATENT DOCUMENTS

EP    0 620 363 A1   10/1994
EP    0 718 470 A2    6/1996
(Continued)

OTHER PUBLICATIONS

English translation of Japanese Office Action (Notification of Reasons for Refusal) dated Dec. 5, 2016, by the Japanese Patent Office in corresponding Japanese Patent Application No. 2015-521009. (6 pgs).

*Primary Examiner* — Phutthiwat Wongwian
*Assistant Examiner* — Loren Edwards
(74) *Attorney, Agent, or Firm* — Buchanan Ingersoll & Rooney PC

(57) ABSTRACT

The invention pertains to a power plant including a gas turbine, a heat recovery boiler arrangement with at least a boiler inlet, and an outlet side with a first exit connected to a stack and a second exit connected to a flue gas recirculation, which connects the second exit to the compressor inlet of the gas turbine. The heat recovery boiler arrangement includes a first boiler flue gas path from the boiler inlet to the first boiler exit, and a separate second boiler flue gas path from the boiler inlet to the second boiler exit. Additionally, a supplementary firing and a subsequent catalytic NOx converter are arranged in the first boiler flue gas path. Besides the power plant a method to operate such a power plant is an object of the invention.

7 Claims, 4 Drawing Sheets

(52) U.S. Cl.
CPC ......... *F05D 2270/082* (2013.01); *Y02E 20/14* (2013.01); *Y02E 20/16* (2013.01); *Y02T 10/22* (2013.01)

(58) Field of Classification Search
USPC ........................................................ 60/772
See application file for complete search history.

(56) References Cited

U.S. PATENT DOCUMENTS

| | | | |
|---|---|---|---|
| 5,589,142 A * | 12/1996 | Gribbon | B01D 53/8656 110/211 |
| 6,775,973 B2 * | 8/2004 | Liu | F01N 3/0807 60/286 |
| 8,166,766 B2 | 5/2012 | Draper | |
| 8,371,100 B2 | 2/2013 | Draper | |
| 2009/0284013 A1 | 11/2009 | Anand et al. | |
| 2012/0073260 A1 * | 3/2012 | Draper | F02C 1/06 60/39.182 |
| 2012/0187688 A1 | 7/2012 | Draper | |

FOREIGN PATENT DOCUMENTS

| | | | |
|---|---|---|---|
| JP | 5011970 A | 2/1975 | |
| JP | 5395179 A | 8/1978 | |
| JP | 2003013729 A | 1/2003 | |
| JP | 2007327389 A | 12/2007 | |
| JP | 2012068014 A | 4/2012 | |
| WO | 96/12091 A1 | 4/1996 | |

* cited by examiner

GAS TURBINE POWER PLANT WITH FLUE GAS RECIRCULATION AND CATALYTIC CONVERTER

CROSS-REFERENCE TO RELATED APPLICATIONS

This application claims priority to PCT/EP2013/064765 filed Jul. 12, 2013, which claims priority to European application 12176258.7 filed Jul. 13, 2012, both of which are hereby incorporated in their entireties.

TECHNICAL FIELD

The invention relates to combined cycle power plant with a catalytic converter and a method for operating such a power plant.

BACKGROUND

Selective catalytic reduction (SCR) with ammonia is a common means for NOx reduction in gas turbine power plants. It converts nitrogen oxides, also referred to as NOx, with the aid of a catalyst into N2, and water, H2O. The use of three-way catalytic converters has been proposed to avoid the use of ammonia. However they require a fuel to air ratio close to the stoichiometric point. To reduce the oxygen content in the combustion gases a gas turbine plant is proposed in the U.S. 2009/0284013 A1, which comprises a gas turbine, a heat recovery steam generator and a flue gas recirculation. The gas turbine comprises a compressor for air, and a compressor for recirculated flue gas, a burner and a turbine. The input side of heat recovery steam generator is connected to a turbine outlet of the gas turbine. The heat recovery steam generator comprises two boiler outlets. A chimney is connected to the first boiler outlet. The flue gas recirculation connects to the second boiler outlet with a compressor inlet of the compressor for recirculated flue gas. Further, a flue gas treatment device in the form of a three-way catalyst disposed upstream of the waste heat boiler is known from this gas turbine plant.

The proposed plant allows combustion with a fuel to air ratio λ close to one by reducing the oxygen content in the combustor inlet gas. However, the complete stable combustion at close to stoichiometric conditions in the restricted space of a gas turbine combustor is difficult to realize. Additionally, the matching of two compressors (e.g. with respect to mass flows and pressures) on a single shaft is difficult to realize for different operation conditions.

SUMMARY

One object of the disclosure is to provide a combined cycle power plant with low NOx emissions, which does not require ammonia for NOx reduction and has a good operational flexibility.

One aspect of the present disclosure is to propose a combined cycle power plant with a gas turbine and the heat recovery boiler arrangement that comprises a first boiler flue gas path from the boiler inlet to a first boiler exit and a separate second boiler flue gas path from the boiler inlet to the second boiler exit with a supplementary firing and a subsequent three-way catalytic converter arranged in the first boiler flue gas path.

The gas turbine comprises at least a compressor, at least one combustor and at least one turbine. The heat recovery boiler arrangement has a boiler inlet connected to a turbine outlet, and an outlet side with a first exit connected to a stack and a second exit connected to a flue gas recirculation, which connects the second exit to the compressor inlet of the gas turbine.

According to one exemplary embodiment the catalytic converter is a three-way catalytic converter. According to another exemplary embodiment the catalytic converter comprises a NOx adsorbing catalyst.

According to an exemplary embodiment the first boiler flue gas path comprises a first sector, which connects the diffusor inlet to the NOx adsorbing catalyst. When in operation the adsorbing catalyst in the first sector is loading with NOx from the gas turbine flue gas. Further, the first boiler flue gas path comprises a second sector, which connects the diffusor inlet to the NOx adsorbing catalyst. The supplementary firing is installed in the second sector between the diffusor inlet and NOx adsorbing catalyst. When in operation the NOx adsorbing catalyst is regenerated in the second sector of the NOx adsorbing catalyst.

One possible arrangement with at least two sectors comprises an adsorbing catalyst, which is rotatable mounted in the first boiler flue gas path. In operation a section of the adsorbing catalyst rotates from the adsorbing sector to the regenerating sector and a regenerating section of the adsorbing catalyst rotates form the regenerating sector to the adsorbing sector. Thus in operation a cyclic loading and regeneration of the adsorbing catalyst can be achieved.

For continuous operation a according to one embodiment the adsorbing catalyst is configured as regenerative rotary catalyst, comprising a generally circular disk arranged to rotate in a cylindrical casing. The casing comprises a connection to the first inlet sector inlet and a connection to a second inlet sector, and has a common outlet.

To reduce the size and fuel consumption the supplementary firing can be minimized. The inlet area to regenerating second sector can be smaller than the inlet area of the adsorbing sector to reduce the size and fuel consumption of the supplementary firing. In an exemplary embodiment the inlet area of the first sector for loading the adsorbing catalyst is at least twice as large as the inlet area for the second sector for regenerating the adsorbing catalyst.

In another exemplary embodiment the NOx adsorbing catalyst is stationary. To allow alternating loading and regeneration of different sections of the NOx adsorbing catalyst the flue gas path is divided in at least two sectors with at least two supplementary sector firings installed upstream of the NOx adsorbing catalyst. Each supplementary sector firings has an independent fuel supply control to allow independent operation of the supplementary firing in each sector for regeneration of the subsequent NOx adsorbing catalyst.

In yet another embodiment of the power plant the heat recovery boiler arrangement comprises a control member arranged to control the mass flow split between of the flue gas entering the first boiler flue gas path and the separate second boiler flue gas path. This control member or control element can for example be a flap, a moveable baffle or a valve installed in one of the flow paths.

According to one exemplary embodiment the compressor intake is split into sectors connected with a flow passage of the compressor, with a feed for fresh air leading through a first sector of the compressor intake, and with a feed for the first flue gas flow leading through a second sector of the compressor intake. In an exemplary arrangement the first and second zone are coaxial. This allows the connection of the line for recirculated flue gas to outer zone of the coaxial inlet zones. As a result flue gas is recirculated to the radially outer zone of the compressor intake and fed to the secondary air system of the gas turbine. This reduces or avoids bypassing oxygen from fresh air around the combustor and can therefore reduce the oxygen content of the flue gases.

Besides the power plant a method for operation of a power plant, which comprises a gas turbine with at least a compressor, a combustor and a turbine, a heat recovery boiler arrangement with at least a boiler inlet connected to a turbine outlet, and an outlet side with a first exit connected to a stack and a second exit connected to a flue gas recirculation, which connects the second exit to the compressor inlet of the gas turbine, is a subject of the disclosure.

According to an exemplary embodiment of the method for operating such a power plant the flue gas is split into two flows in the heat recovery boiler arrangement, with a first flow flowing from the boiler inlet to the first boiler exit and a second flow flowing from the boiler inlet to the second boiler exit. The second flow is recirculated from the second boiler exit into the compressor inlet flow of the gas turbine. The oxygen content in at least a fraction of the first flow is reduced continuously or at least for a period of time by a supplementary firing and NOx is removed from the first flow in a catalytic converter before the first flow is released from the first boiler exit.

According to one configuration of the method NOx is removed in an adsorbing catalyst.

According to an exemplary embodiment of the method the fraction of the first flow with reduced oxygen content is fed to a first sector in the adsorbing catalyst for regeneration of first sector of the adsorbing catalyst and the remaining first flow is fed to a second sector in the adsorbing catalyst. NOx is removed from the first flow in both: the first sector and second sector of the adsorbing catalyst. While adsorbing NOx the adsorbing catalyst in the second sector is loading. Depending on the capacity of the NOx adsorbing catalyst and the NOx emissions contained in the flue gas a periodic regeneration of the adsorbing catalyst is required. The sectors, which are regenerated are changed accordingly, e.g. periodically over time, as a function of at least one of NOx adsorbing capacity, time, NOx emissions and flow velocity. Alternatively or in combination the NOx loading of the catalyst can be measured.

According to one embodiment of the method the NOx adsorbing catalyst is configured as regenerative rotary catalyst comprising a generally circular disk and is rotated to move the regenerated section of the adsorbing catalyst out of the first sector for loading with NOx in the second sector. Due to the rotation the at least partly loaded section of the adsorbing catalyst is moved out of the second sector for regeneration into the first sector at the same time. The rotational speed can be adjusted to assure that the adsorbing catalyst is moved back from the second sector to the first section before it is completely loaded.

The sizes of the first and second sections are chosen depending on the thickness of the adsorbing catalyst in flow direction, the NOx emissions and the flow velocity.

According to an alternative embodiment the first boiler flue gas path is divided into sectors, with at least one supplementary sector firing arranged in each sector. According to the method the supplementary sector firing are alternatingly turned on to regenerate the corresponding sector of the NOx adsorbing catalyst and turned off for loading the corresponding sector of the NOx adsorbing catalyst with NOx.

According to a further exemplary embodiment the supplementary firing is alternatingly turned on for regeneration of the adsorbing catalyst and turned off to minimize fuel consumption for the supplementary firing while the adsorbing catalyst is filling with NOx. Turning on and off of the supplementary firing can be combined with sector-wise sector firing.

The above described gas turbine can be a single combustion gas turbine or a sequential combustion gas turbine as known for example from EP0620363 B1 or EP0718470 A2. The disclosed method can be applied to single combustion gas turbine as well as to a sequential combustion gas turbine.

It will be appreciated by those skilled in the art that the present invention can be embodied in other forms without departing from the spirit or essential characteristics thereof. For example a supplementary firing has been proposed for regeneration of the NOx adsorbing catalyst. The NOx adsorbing catalyst can also be regenerated by injecting or admixing CO or unburned hydrocarbon into the flue gas flow upstream of the NOx adsorbing catalyst or the section of NOx adsorbing catalyst. When regenerating the NOx adsorbing catalyst the speed of regeneration has to be controlled to avoid overheating of the NOx adsorbing catalyst or subsequent installations. Therefore a control in rate of injection of CO or unburned hydrocarbons can be foreseen. This control can for example control the flow of CO or unburned hydrocarbons as a function of the temperature in the NOx adsorbing catalyst or the flue gas flow downstream thereof.

BRIEF DESCRIPTION OF THE DRAWINGS

The invention, its nature as well as its advantages, shall be described in more detail below with the aid of the accompanying drawings. Referring to the drawings.

DETAILED DESCRIPTION

The same or functionally identical elements are provided with the same designations below. The values and dimensional specifications indicated are only exemplary values and do not constitute any restriction of the invention to such dimensions.

Figure 1:
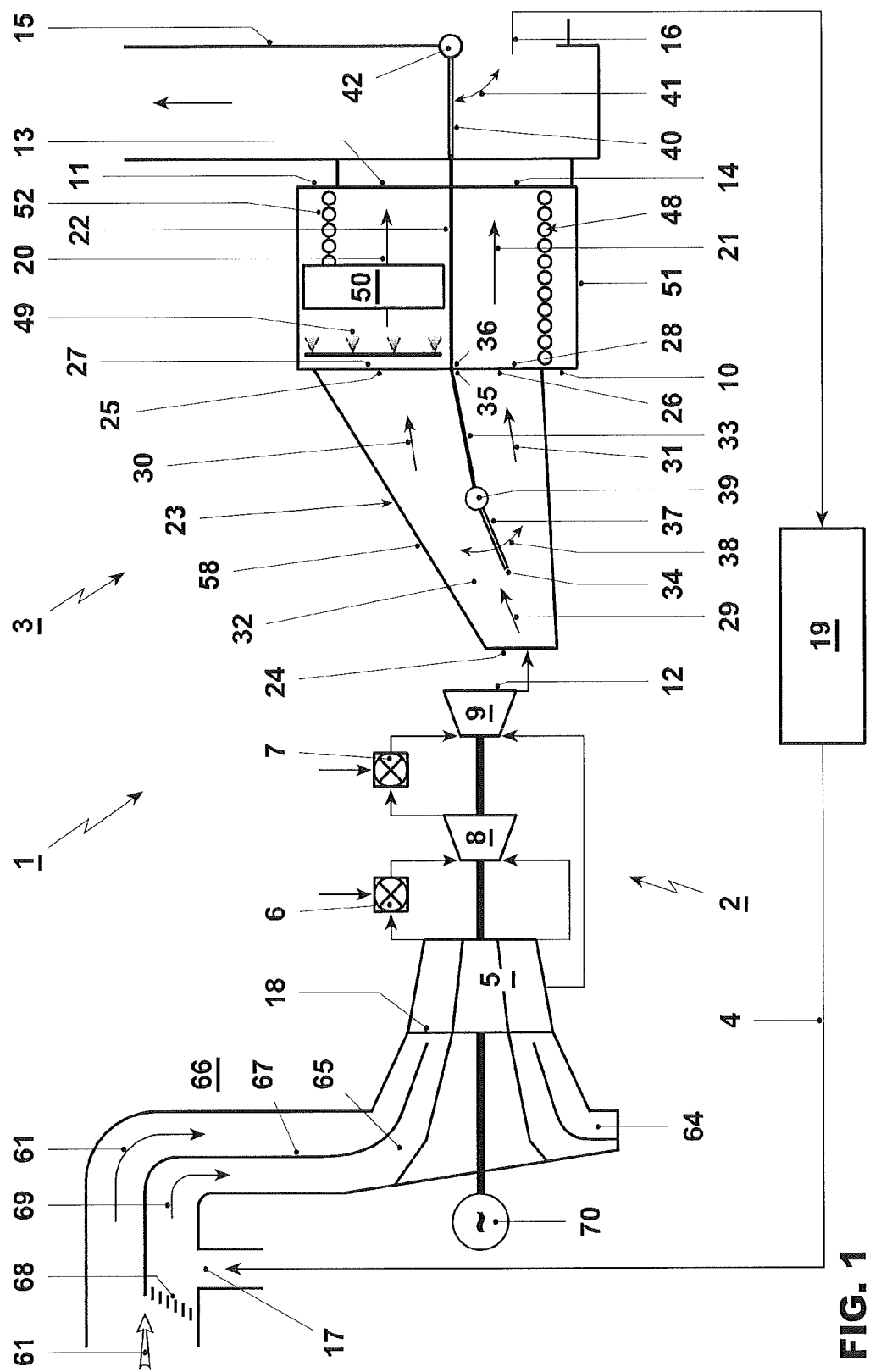
FIG. 1 shows a first example of a gas turbine according to the present invention.
Figure 2:
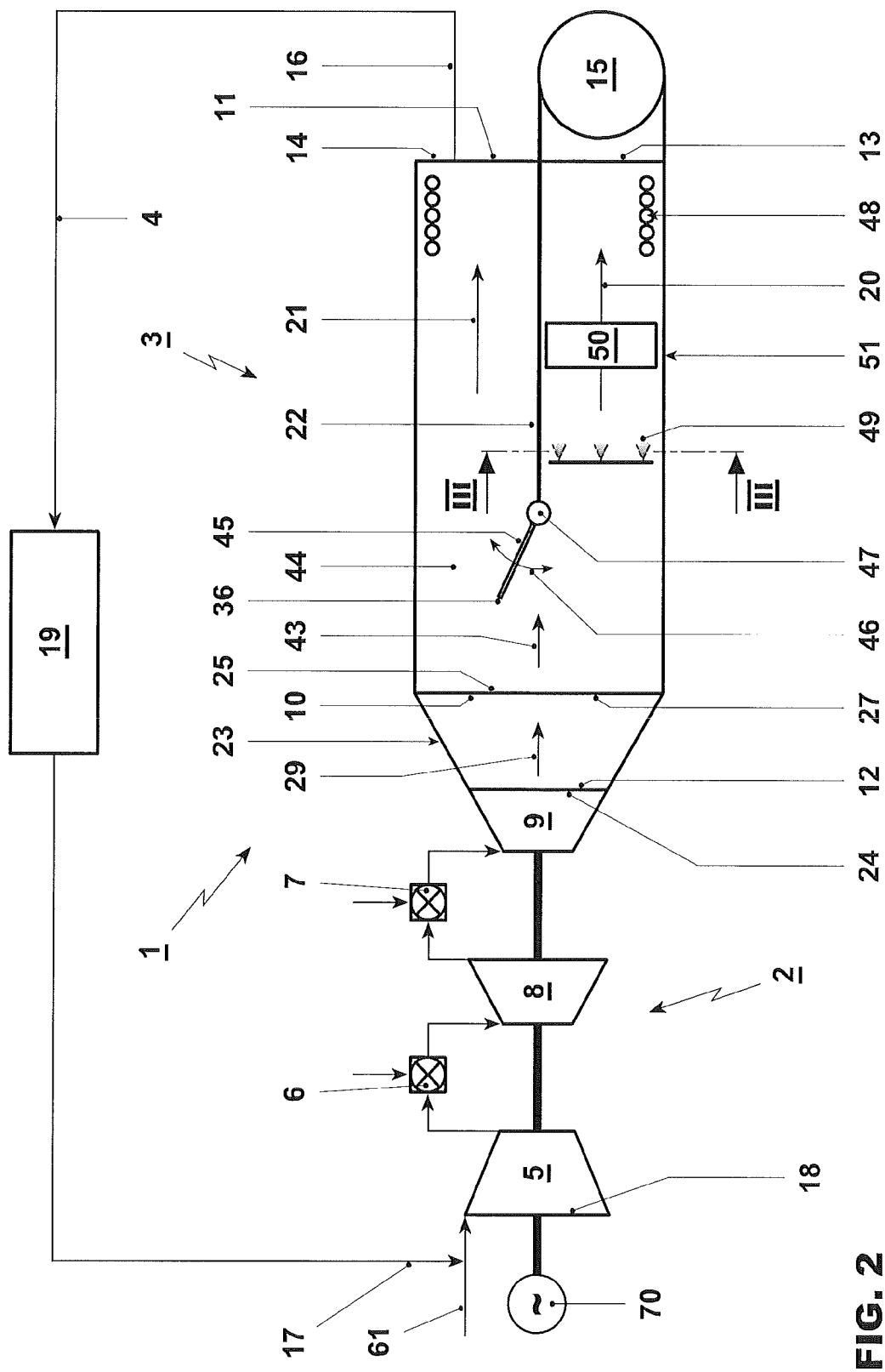
FIG. 2 shows a second example of a gas turbine according to the present invention.

According to the FIGS. 1 and 2 an exemplary gas turbine power plant 1, which can for example be applied in a power plant arrangement for electricity generation, comprises at least a gas turbine 2, at least a heat recovery boiler arrangement 3 as well as at least a flue gas recirculation 4. The respective gas turbine 2 comprises at least one compressor 5, at least a combustor 6, 7 as well as at least one turbine 8, 9. In the embodiments shown here the gas turbine 2 comprises two turbines 8 and 9, namely a high pressure turbine 8 and a low pressure turbine 9. Accordingly, two combustors 6 and 7 are also provided, namely a high pressure combustor 6 upstream of the high pressure turbine 8 and a low pressure combustor 7 upstream of the low pressure turbine 9. FIG. 1 shows a side view, and FIG. 2 a top view of exemplary gas turbine power plants 1. The steam generated in the boiler 3 can be used in a water-steam cycle or for co-generation (not shown).

The heat recovery boiler arrangement 3 has a boiler inlet side 10 and a boiler exit side 11. The boiler inlet side 10 is fluidically connected with a turbine outlet 12 of the low pressure turbine 9. The boiler exit side 11 comprises a first boiler exit 13 and a second boiler exit 14. The first boiler exit 13 is connected with a stack 15. Between the first boiler exit 13 and the stack CO2 capture equipment can be arranged (not shown). The second boiler exit 14 is fluidically connected with an inlet 16 of the flue gas recirculation 4. An outlet 17 of the flue gas recirculation 4 is connected with a compressor inlet 18 of the compressor 5. Therefore the flue gas recirculation 4 connects the second boiler exit 14 with the compressor inlet 18. In the examples a flue gas re-cooler 19 is arranged in the flue gas recirculation 4, which can be designed as a DCC (direct contact cooler), so that the recirculated flue gas can be cooled and be washed at the same time.

In the embodiments shown the heat recovery boiler arrangement 3 comprises a first boiler flue gas path 20, which is indicated in the FIGS. 1 and 2 by an arrow. The first boiler flue gas path 20 starts at the boiler inlet side 10 and leads to the first boiler exit 13. Further, the heat recovery boiler arrangement 3 comprises a second boiler flue gas path 21, which is also indicated by an arrow. The second boiler flue gas path 21 also starts at the boiler inlet side 10 and leads to the second boiler exit 14. Both boiler flue gas paths 20, 21 are separated and lead to the respective boiler exits 13, 14. For the realization of the separated boiler flue gas paths 20, 21 within the heat recovery boiler arrangement 3 a boiler partition 22 can be arranged in the heat recovery boiler arrangement 3, which fluidically separates both boiler flue gas paths 20, 21.

In the embodiments shown in here a diffuser 23 is arranged upstream of the boiler inlet side 10. The diffuser inlet 24 is connected with the turbine outlet 12. In each case the diffuser 23 comprises a diffuser inlet 24 and at least a diffuser exit 25, 26. In the embodiment of FIG. 1 two diffuser exits, namely the first diffuser exit 25 and the second diffuser exit 26 are shown. In contrast only a single, common diffuser exit 25 is shown in the embodiment of the FIG. 2.

In the embodiment of FIG. 2 a common diffuser exit 25 is fluidically connected with the boiler inlet side 10. In the embodiment of FIG. 1 the first diffuser exit 25 is fluidically connected with the first boiler inlet 27, while the second diffuser exit 26 is fluidically connected with the second boiler inlet 28. Both boiler inlets 27, 28 are arranged at the boiler inlet side 10. According to the embodiment of FIG. 1 the first boiler flue gas path 20 leads from the first boiler inlet 2 to the first boiler exit 13. In parallel and separately the second boiler flue gas path 21 leads from of the second boiler inlet 28 to the second boiler exit 14.

In the diffuser 23 of FIG. 1 a common diffuser main path 29, which is indicated by an arrow, as well as the first diffuser flue gas path 30 which is indicated by an arrow, and the second diffuser flue gas path 31, which is also indicated by an arrow, are arranged. The common diffuser main path 29 is split into the separated diffuser flue gas paths 30, 31 at a diffusor branching point 32. To separate the diffuser flue gas paths 30, 31 a diffuser partition 33 is arranged in a diffuser housing 58 of the diffuser 23. A leading edge 34 of the diffuser partition 33 defines the diffusor branching point 32. The diffuser partition 33 separates both diffuser flue gas paths 30, 31 from the diffusor branching point 32 up to both diffuser exits 25, 26. In the example of the FIG. 1 the diffuser partition 33 and the boiler partition 22 are arranged such that trailing edge 35 of the diffuser partition 33 and a leading edge 36 of the boiler partition 22 adjoin.

By the adjoining the partitions 22, 33 the first diffuser flue gas path 30 passes directly on to the first boiler flue gas path 20, while at the second diffuser flue gas path 31 passes on to the second boiler flue gas path 21.

In the exemplary embodiment of FIG. 1 a control member 37 is arranged at the diffusor branching point 32, which is pivotable around a swivel axis 39 as indicated by the arrow 38. With the help of the control member 37 the split of the flue gas flow to both diffuser flue gas paths 30, 31 can be controlled.

In the exemplary embodiment of FIG. 2 is a control member 45 is arranged at the boiler branching point 44, which is pivotable around a swivel axis 47 as indicated by the arrow 46. With the help of the control member 45 the split of the flue gas flow to both boiler flue gas paths 20, 21 can be controlled.

In the first boiler flue gas path 20 a supplementary firing 49, catalytic NOx converter 50 and a first heat exchanger array 52 are provided. The catalytic NOx converter 50 is arranged downstream of the supplementary firing 49. In the examples shown here the first heat exchanger array 52 is arranged downstream of the catalytic NOx converter 50. However, depending on the temperature after the supplementary firing and on the design of the catalytic NOx converter 50 a part of the first heat exchanger array 52 can be arranged upstream of the catalytic NOx converter 50 to reduce the flue gas temperature, and the remaining first heat exchanger array 52 can be arranged downstream of the catalytic NOx converter 50.

In the second boiler flue gas path 21 a second heat exchanger array 48 is provided. The first heat exchanger array 52 and second heat exchanger array 48 can be separated arrangements or integrated with at least part of the heat exchanger elements passing from the first to the second boiler flue gas path 21.

As shown in FIG. 1 a control member 40, which is pivotable around a swivel axis 40 as indicated by the arrow 41, can be arranged at the downstream end of the heat recovery boiler arrangement 3. This control member can be used as alternative or in combination with the control member 37 to control the split between recirculated flue gas and flue gas directed to the stack 15. Further, it can be used to stop flue gas recirculation and to allow the second boiler flue gas path 21 to exit to the stack 15.

If the oxygen concentration of the flue gases in the first boiler flue gas path 20 can be controlled over the entire cross section with the help of the supplementary firing 49 a three-way catalytic converter 50 can be used. For measurement of the oxygen concentration at least a λ-sensor can be used. The measured oxygen concentration can be used to control the fuel flow to the supplementary firing 49.

Recirculated flue gas and fresh air 61 can be mixed upstream of the compressor inlet 18 as schematically shown in FIG. 2.

In another exemplary embodiment of a power plant 1 the compressor intake is split into two sectors as shown in FIG. 1. In the depicted example, the compressor intake 66 is split by means of an intake baffle plate 67 into an outer fresh air intake sector 64 for fresh air 61 and into a flue gas intake sector 65 for recirculated flue gas 69. This splitting of the compressor intake 66 leads to an essentially coaxial inflow of recirculated flue gas and fresh air 61 into the compressor 5. A fresh air control element 68 allows the supply of fresh air to the flue gas intake sector 65 to allow operation with reduced or no flue gas recirculation.

Figure 3:
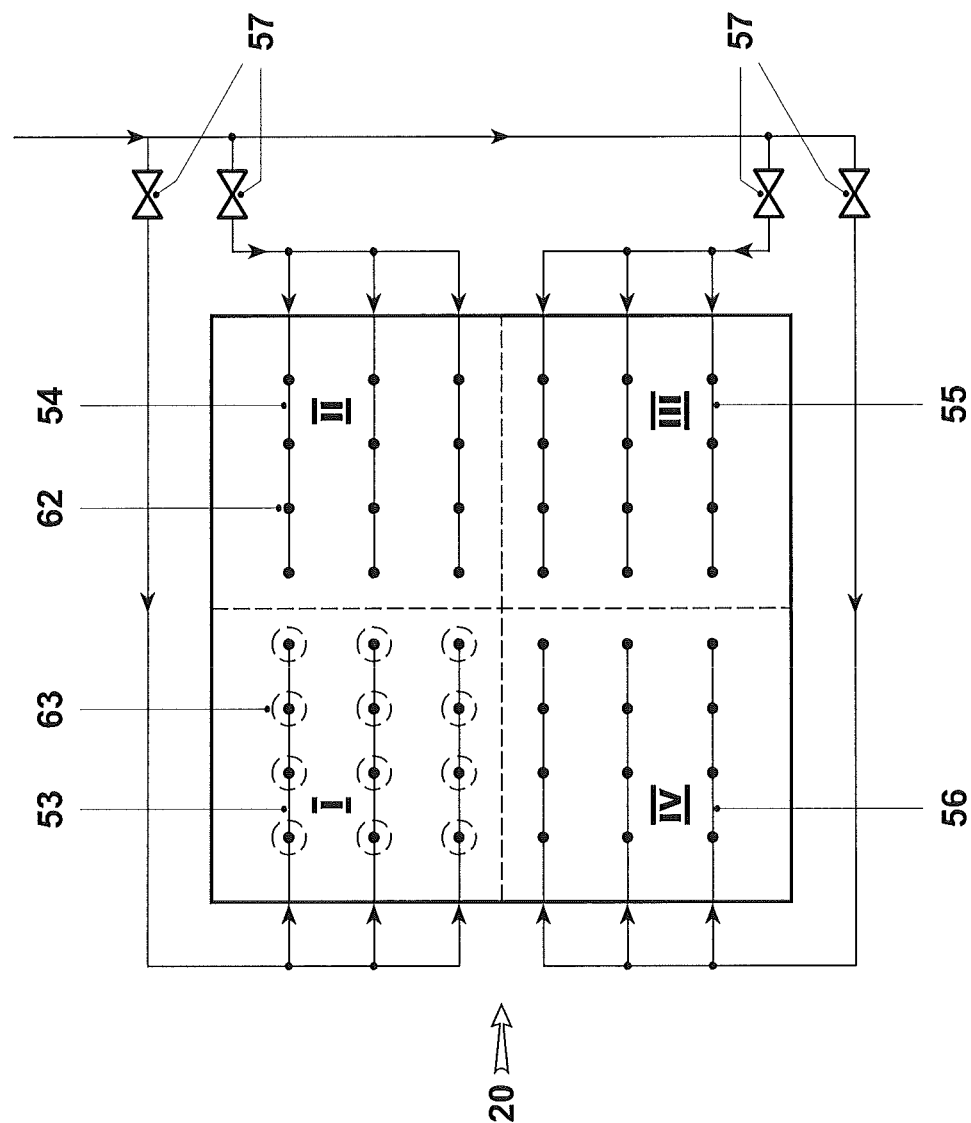
FIG. 3 shows an example of a supplementary firing with sectors.

To minimize the fuel consumption of the supplementary firing 49, the combination of a NOx adsorbing catalyst 50 with a supplementary sector firing 53, 54, 55, 56 is proposed. FIG. 3 shows one exemplary variant of the cross section III-III of the FIG. 2. The cross section is divided into four sections I-IV. In each of the sectors a supplementary sector firing 53, 54, 55, 56 is arranged. Each of the supplementary sector firings 53, 54, 55, 56 can be individually controlled by sector control valve 57. Thus the sector firings 53, 54, 55, 56 can be individually activated and the fuel flow controlled to a stoichiometric fuel ratio to assure that the flue gasses passing the activated sector firing 53, 54, 55, 56 have a $\lambda$ close to one. Typically the fuel flow to an activated sector is controlled to keep $\lambda$ in a range between 0.97 and 1.03 for regeneration of the NOx adsorbing catalyst 50. The remaining supplementary sector firings 53-56 can be switched of and NOx adsorbing catalyst 50 is loading.

Figure 4:
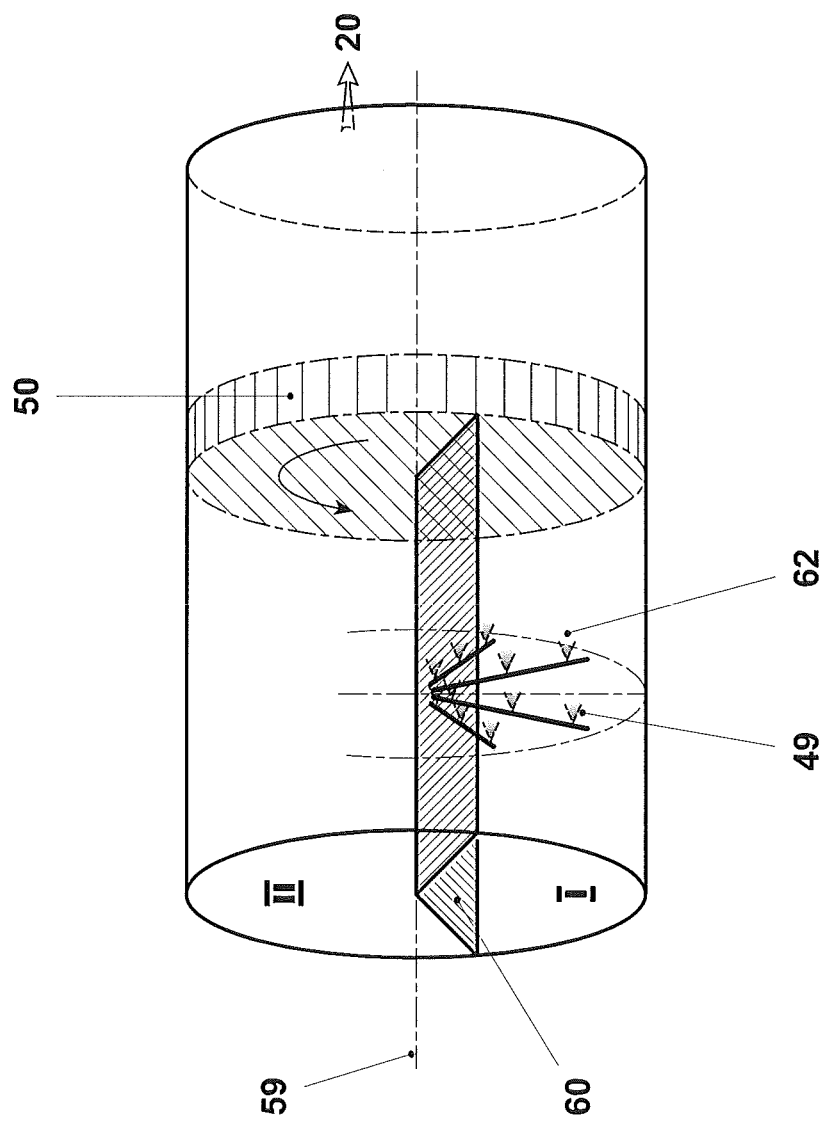
FIG. 4 shows an example of a supplementary firing with subsequent rotating NOx adsorbing catalyst.

Another exemplary embodiment with sectorwise loading and regeneration of the NOx adsorbing catalyst 50 is shown in FIG. 4. In this example the first boiler flue gas path 20 has a cylindrical shape in the region of the NOx adsorbing catalyst 50. The NOx adsorbing catalyst 50 has the shape of a circular disk and is mounted rotatable around a rotating axis 59. The supplementary firing 49 is arranged in a first sector I of a circle upstream of the NOx adsorbing catalyst 50. When in operation part of the flue gas in the first boiler flue gas path 20 passes the supplementary firing 49, which is controlled to a stoichiometric fuel ratio to assure that the flue gasses passing the activated sector firing have a $\lambda$ close to one, typically with $\lambda$ □ in a range between 0.97 and 1.03 for regeneration of the NOx adsorbing catalyst 50. The remaining second sector II of the NOx adsorbing catalyst 50 is loading with NOx.

The sector of the supplementary firing 49 can be separated from the remaining flue gas by a partition wall 60.

It will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A power plant, comprising:
a gas turbine including a compressor, a combustor and a turbine;
a heat recovery boiler arrangement with at least a boiler inlet connected to a turbine outlet, and an outlet side with a first exit connected to a stack and a second exit connected to a flue gas recirculation which connects the second exit to an inlet of the compressor, wherein the heat recovery boiler arrangement includes:
a first boiler flue gas path from the boiler inlet to the first boiler exit;
a separate second boiler flue gas path from the boiler inlet to the second boiler exit, and
a supplementary firing and a subsequent catalytic NOx converter in the first boiler flue gas path;
wherein the catalytic NOx converter includes a NOx adsorbing catalyst,
wherein the first boiler flue gas path is divided into at least two sectors with at least two supplementary sector firings installed upstream of the NOx adsorbing catalyst in the at least two separate sectors, with independent fuel supply control for the supplementary sector firings, to allow independent operation of the supplementary sector firings in each sector for regeneration of the subsequent NOx adsorbing catalyst.

2. The power plant according to claim 1, wherein the gas turbine includes a diffuser arranged downstream of the turbine and upstream of the heat recovery boiler arrangement and the first boiler flue gas path includes a first sector, which connects a diffusor inlet to the NOx adsorbing catalyst, for loading the NOx adsorbing catalyst with NOx from a gas turbine flue gas and a second sector which connects the diffusor inlet to the NOx adsorbing catalyst, with the supplementary firing installed between the diffusor inlet and NOx adsorbing catalyst for regenerating the NOx adsorbing catalyst.

3. The power plant according to claim 1, wherein the heat recovery boiler arrangement includes a control member arranged to control a mass flow split between flue gas entering the first boiler flue gas path and the separate second boiler flue gas path.

4. The power plant according to claim 1, wherein a compressor intake is split into sectors connected with a flow passage of the compressor, with a fresh air intake sector leading fresh air to the inlet of the compressor, and with flue gas intake sector leading recirculated flue gas flow to the inlet of the compressor.

5. A method for operating a power plant with a gas turbine with at least a compressor, a combustor and a turbine,
a heat recovery boiler arrangement with at least a boiler inlet connected to a turbine outlet, and an outlet side with a first exit connected to a stack and a second exit connected to a flue gas recirculation, which connects the second exit to an inlet of the compressor; the method comprising:
splitting the flue gas into two flows in the heat recovery boiler arrangement, with a first boiler flue gas path flow flowing from the boiler inlet to the first boiler exit and a second boiler flue gas path flow flowing from the boiler inlet to the second boiler exit;
recirculating the second boiler flue gas path flow from the second boiler exit into the compressor inlet of the gas turbine;
reducing the oxygen content in at least a fraction of the first boiler flue gas path flow at least for a period of time by a supplementary firing and in that NOx is removed from the first boiler flue gas path flow in a catalytic NOx converter before the first boiler flue gas path flow is released from the first boiler exit;
wherein the NOx is removed in a NOx adsorbing catalyst;
wherein the first boiler flue gas path flow is further divided into sectors with at least one supplementary firing arranged in each sector; and
turning the supplementary sector firings alternatingly on and off to respectively regenerate the corresponding sector of the NOx adsorbing catalyst and load the corresponding sector of the NOx adsorbing catalyst with NOx.

6. The method according to claim 5, comprising:
feeding the fraction of the first boiler flue gas path flow with reduced oxygen content to a first sector in the NOx adsorbing catalyst for regeneration of the first sector of the NOx adsorbing catalyst; and
feeding a remaining first boiler flue gas path flow to a second sector of the NOx adsorbing catalyst, wherein NOx is removed from the first boiler flue gas path flow in the first sector as well as in the second sector of the NOx adsorbing catalyst.

7. The method according to claim 5, comprising:
turning the supplementary firing alternatingly on for regeneration of the adsorbing catalyst and off to minimize fuel consumption while the adsorbing catalyst is filling with NOx.

* * * * *